UNITED STATES PATENT OFFICE.

RICHARD B. EARLE, OF BOSTON, MASSACHUSETTS, ASSIGNOR TO HOOD RUBBER COMPANY, OF BOSTON, MASSACHUSETTS, A CORPORATION.

PROCESS OF PREPARING RUBBER FROM HYDROCARBONS.

1,093,923.  Specification of Letters Patent.  Patented Apr. 21, 1914.

No Drawing.   Application filed November 12, 1910.   Serial No. 592,098.

*To all whom it may concern:*

Be it known that I, RICHARD B. EARLE, a citizen of the United States, residing at Boston, Massachusetts, have invented certain new and useful Improvements in Processes of Preparing Rubber from Hydrocarbons, of which the following is a specification.

The object of the invention is to prepare artificial rubber from hydrocarbons in a commercially practicable manner, and the invention consists in the process hereinafter described and defined in the appended claims.

According to my invention, I convert liquid unsaturated hydrocarbons into rubber by polymerization.

I have found that certain hydrocarbons, to wit isoprene and homologues of the same, may be polymerized by the use of certain agents which are applied in conjunction with heat into artificial rubber. As chemicals for the conversion of the same, I can use any alkaline agent, such as caustic alkalis, ammonia, or substituted amins, or amino or imino compounds.

In order to effect the conversion of the hydrocarbons into rubber, I proceed as follows: The mixture of the alkaline agent and the hydrocarbon is heated for a suitable length of time in a closed vessel under pressure to temperatures ranging from 212° F. to 250° F. At the end of the heating, the rubber obtained may be purified in any of the usual ways. As a specific example, I may take the hydrocarbon isoprene and saturate it with dry ammonia gas at 32° F., and thereafter heat it to 220° F. for approximately one hundred hours in a closed vessel under the pressure of isoprene vapor for the temperature stated, the yield being approximately 30%.

I claim as my invention:

1. The herein described method of producing artificial rubber which consists in saturating a hydrocarbon of the homologous series of which 1.3-butadien is the lowest member with ammonia gas and subjecting the same to heat and pressure.

2. The hereinbefore described method of producing artificial rubber which consists in saturating isoprene with dry ammonia gas and subjecting the same to heat and pressure, substantially as described.

In testimony whereof, I affix my signature in presence of two witnesses.

RICHARD B. EARLE.

Witnesses:
 JAMES M. SPEAR,
 WILLIAM W. FIRMEN.